United States Patent [19]

Graasl et al.

[11] 4,403,141

[45] Sep. 6, 1983

[54] METHOD AND APPARATUS FOR BINARY CODING OF SENSOR SIGNALS FROM OPTOELECTRONIC SENSOR ELEMENTS

[75] Inventors: Hans P. Graasl, Zorneding; Heiner Herbst; Frank Endlicher, both of Munich, all of Fed. Rep. of Germany

[73] Assignee: Siemens Aktiengesellschaft, Berlin & Munich, Fed. Rep. of Germany

[21] Appl. No.: 330,946

[22] Filed: Dec. 15, 1981

[30] Foreign Application Priority Data

Jan. 30, 1981 [DE] Fed. Rep. of Germany ....... 3103154

[51] Int. Cl.$^3$ ............................................. H01J 40/14
[52] U.S. Cl. ................................ 250/214 R; 250/209
[58] Field of Search .................. 250/214 R, 209, 528, 250/204; 354/25 R

[56] References Cited

PUBLICATIONS

*Semiconductor Memory Design and Application* by Luecke et al., International Student Edition, McGraw-Hill Kogakusha, Ltd., Tokyo, 1973, pp. 65–69.

*Primary Examiner*—David C. Nelms
*Assistant Examiner*—Darwin R. Hostetter
*Attorney, Agent, or Firm*—Hill, Van Santen, Steadman & Simpson

[57] ABSTRACT

A method and apparatus for binary coding of sensor signals received from a number of optoelectronic sensor elements employ an evaluator associated with each sensor element for generating binary output signals corresponding to the amount of charge generated by the associated sensor element. Selected pairs of evaluators are connected to an electronic switch, with one of the evaluator outputs serving to actuate the switch for the purpose of undertaking a charge quantity comparison between the associated sensors which are disposed a small distance from one another. Each evaluator includes a converter consisting of a switching transistor and a load element connected in series, and a barrier transistor connecting the output of the associated sensor element with the input of the converter, and a reset transistor for connecting the converter input with a constant voltage source.

18 Claims, 8 Drawing Figures

METHOD AND APPARATUS FOR BINARY CODING OF SENSOR SIGNALS FROM OPTOELECTRONIC SENSOR ELEMENTS

BACKGROUND OF THE INVENTION

The present invention relates to methods and apparatus for binary coding of sensor signals received from a number of optoelectronic sensor elements, and in particular to such methods and apparatus wherein a charge quantity comparison is undertaken between the optically generated charges of two closely-disposed sensor elements.

A circuit which undertakes a binary coding of sensor signals which are generated by a plurality of adjacent optoelectronic sensor elements is described in German application No. P 29 36 521.7 filed in Germany on Sept. 10, 1979, corresponding to U.S. Ser. No. 173,195 filed on Sept. 25, 1980 (Grassl). That circuit employs a number of evaluators respectively associated with each sensor element which generate binary output signals corresponding to the quantity of charge generated by the associated sensor element and undertakes a comparison of the output signals of evaluators associated with two sensor elements which are disposed adjacent to each other or at a small distance from one another. This circuit may be employed, for example, in photographic or electronic cameras for evaluating the signals of sensor elements which optoelectronically measure the distance to an object which is to be photographed. A signal is derived from the binary output signals from the evaluators which is supplied to a display device for visual display of the calculated distance or to a focusing adjustment device for automatic adjustment of the optimum distance of the camera lens from an image plane for accurately focusing the image of the subject on the image plane. The evaluators are in the form of comparators and receive sensor signals from two sensor elements which are to be compared with one another. Unavoidable manufacture-induced deviations from ideal values within specified tolerances of the circuit elements employed in such a circuit, however, influence the precision with which the quantity comparison between the sensor signals can be undertaken, and thus the ultimate binary coding of the sensor signals is also influenced in a random and unknown manner.

SUMMARY OF THE INVENTION

It is an object of the present invention to provide a method and circuit for undertaking a binary coding of sensor signals received from a plurality of optoelectronic sensor elements which minimizes the influence of manufacture-induced deviations from ideal component values on the precision of the binary coding.

The above object is inventively achieved in a circuit, and a method of operation for the circuit, of the type described above wherein each evaluator includes an inverter which consists of a switching transistor and a load element connected in series, a barrier transistor connecting the output of a sensor element with the input of the converter, and a reset transistor connecting the converter input with a constant voltage source. Two evaluators which are individually associated with two sensor elements are employed for the purpose of undertaking a quantity comparison and are connected with one another via an electronic switch such that the output of one of the evaluators serves to actuate the electronic switch.

The circuit and method in accordance with the principles of the present invention described above achieve a minimization of the influence of deviations from ideal component values in the components comprising the circuit by the use of the barrier transistors in each evaluator. The barrier transistors serve for resetting the sensor elements as well as evaluating the optically generated charges received from the sensor elements such that deviations from ideal values in the components comprising the converters are largely immaterial because exceeding the barrier inherent in the barrier transistors by quantities of charge carriers, which are dependent upon the exposure of the sensor elements, serves as the criterion for causing a switchover of the converters from a first stable switching state to a second stable switching state. The charge carrier quantity comparison between the optically-generated charges of two sensor elements is undertaken by evaluating the chronological sequence of such switchovers of converters associated with the two sensor elements, the significant factor being which of the two is the first to switchover.

DESCRIPTION OF THE PREFERRED EMBODIMENTS

Figure 1:
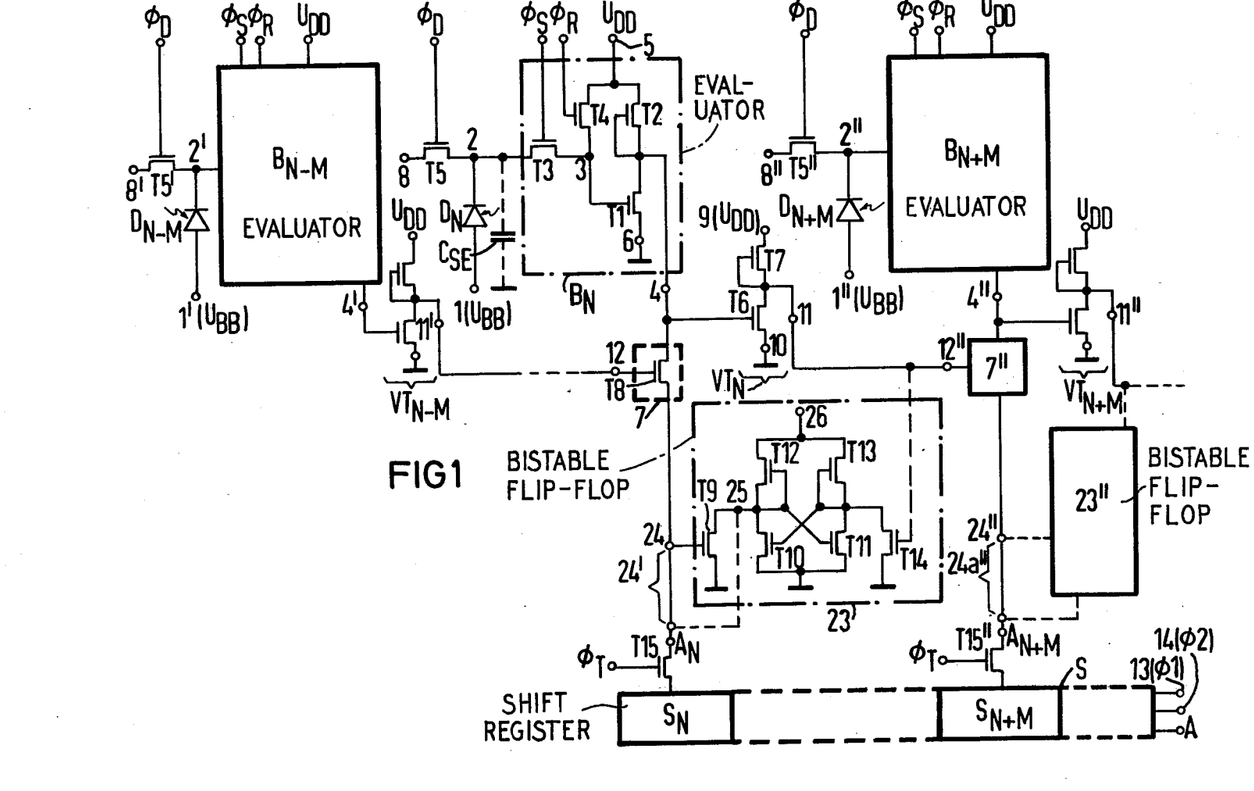
FIG. 1 is a circuit diagram of a circuit for binary coding of sensor signals from a plurality of optoelectronic sensor elements constructed in accordance with the principles of the present invention and for practicing the method of the present application.

A circuit for binary coding of sensor signals received from a number of optoelectronic sensor elements is shown in FIG. 1. The optoelectronic sensor elements are in the form of photodiodes, three of which are shown in FIG. 1 referenced at $D_{N-M}$, $D_N$ and $D_{N+M}$. The photodiodes are arranged adjacently in a row. The photodiode $D_N$ represents the $N^{th}$ photodiode in this row, whereas the photodiodes $D_{N-M}$ and $D_{N+M}$ respectively represent the $M^{th}$ adjacent diodes to the left and right of the photodiode $D_N$. For example, if $M=1$, the photoodiodes $D_{N-M}$ and $D_{N+M}$ would be the photodiodes immediately adjacent to $D_N$. It will be understood, however, that M may assume a numerical value of any integer up to a reasonable number necessary to comprise the photodiode array, however, no matter what value M assumes, the photodiodes $D_{N-M}$ and $D_{N+M}$ will be disposed only a relatively small distance from the photodiode $D_N$. It will be understood in the exemplary embodiment shown in FIG. 1 that M may assume a value other than 1 in which case other photodiodes will be disposed between the photodiodes illustrated in FIG. 1, but those intervening photodiodes are omitted for purposes of clarity.

The photodiode $D_N$ is connected at its anode to a terminal 1 which is in turn connected to a voltage $U_{BB}$, and is connected at its cathode to an evaluator $B_N$ at a connection point 2. The evaluator $B_N$ includes a barrier transistor T3, a reset transistor T4 and a converter. The converter consists of a switching transistor T1 and a field effect transistor T2 connected as a load element for operation as an inverter. The connection point 2 is connected with the input 3 of the converter (consisting of the transistors T1 and T2) via the source-drain path of the barrier transistor T3. The gate of the transistor T3 is connected to a pulse voltage $\phi_S$. The gate and source of T2 are interconnected and are also connected to the output 4 of the evaluator $B_N$. The series-connected transistors T1 and T2 are disposed between a terminal 5, which is supplied with a constant voltage $U_{DD}$, and a reference potential connected at a terminal 6. The reset transistor T4 is supplied with a clock pulse voltage $\phi_R$ at its gate and is connected through its source-drain path between the converter input 3 and the terminal 5. An evaluator of this type is described in German patent application No. P 29 36 492.9 filed in Germany on Sept. 10, 1979 corresponding to U.S. Ser. No. 168,647 filed on July 11, 1980 (Herbst and Pfleiderer).

The output 4 of the evaluator $B_N$ is connected to a circuit output $A_N$ through an electronic switch 7. The cathode of the photodiode $D_N$ is also connected at the connection point 2 to a switching transistor T5 which has a gate supplied with a clock pulse voltage $\phi_D$ and which is also connected to a terminal 8 which exhibits the reference potential for the circuit. The evaluators $B_{N-M}$ and $B_{N+M}$, respectively associated with the photodiodes $D_{N-M}$ and $D_{N+M}$ at connection points 2' and 2" are identically connected. Specifically, the connection points 2' and 2" are connected to respective switching transistors T5' and T5" each of which are supplied with the pulse voltage $\phi_D$ at their gates, and which are also connected to terminals 8' and 8" which exhibit the reference potential for the circuit. The anodes of the diodes $D_{D-M}$ and $D_{N+M}$ are connected to the voltage $U_{BB}$ at respective terminals 1' and 1" and the evaluators $B_{N-M}$ and $B_{N+M}$ have respective outputs 4' and 4". The internal components of all of the evaluators are identical.

An inverter $VT_N$ is connected to the output 4 of the evaluator $B_N$. The inverter $VT_N$ consists of a series-connected transistor T6 and load element which, in the embodiment shown in FIG. 1, is formed by a transistor T7 having its gate and source interconnected. The load element is also connected to the potential $U_{DD}$ at a terminal 9 and the transistor T6 is connected to the reference potential at a terminal 10. The output of the inverter $VT_N$ is referenced at 11. Identical inverters $VT_{N-M}$ and $VT_{N+M}$ have respective outputs 11' and 11" and are identically connected to $U_{DD}$ and to the reference potential, as well as to the respective outputs 4' and 4" of the evaluators $B_{N-M}$ and $B_{N+M}$.

In the embodiment shown in FIG. 1 the electronic switch 7 consists of a transistor T8 and has an input 12. An identical electronic switch 7" is connected to the evaluator output 4" and has an input 12". The outputs 4, 4' and 4" are logic-linked with one another such that the output 11' of the inverter $VT_{N-M}$ is connected to the control input 12 of the electronic switch 7, and the output 11 of the inverter $VT_N$ is connected to the control input 12' of the electronic switch 7". The output of the electronic switch 7" is connected with a circuit output $A_{N+M}$. Selected photodiodes are thus logic-linked with one another in pairs such that the two photodiodes in each pair exhibit a diode interval from one another corresponding to M. Each photodiode pair has a circuit output associated therewith, for example, the photodiodes $D_{N-M}$ and $D_N$ have the associated circuit output $A_N$ and the photodiodes $D_N$ and $D_{N+M}$ have the associated circuit output $A_{N+M}$. Additional circuit outputs are present but not shown in FIG. 1 for as many pairs of photodiodes as comprise the photodiode array. The circuit outputs such as $A_N$ and $A_{N+M}$ are connected to the inputs of respective stages $S_N$ and $S_{N+M}$ of a static or dynamic shift register S. The shift register S has terminals 13 and 14 to which appropriate clock pulse voltages $\phi_1$ and $\phi_2$ are supplied. The shift register S may, for example, be of the type described on pages 65 to 69 of the text "Semiconductor Memory Design and Application" by Luecke, Mize, and Carr, International Student Edition, McGraw-Hill Kogakusha Ltd. Tokyo 1973 particularly the type shown in FIGS. 3.5 and 3.7 of the text, which also illustrate appropriate waveforms for $\phi_1$ and $\phi_2$. As described therein, the stages of the shift register S are designed such that the circuit outputs, such as $A_N$, are respectively connected to the inputs of converters which are contained in the individual cascade connections (or step switchings). The output of the shift register S is referenced at A.

Figure 2:
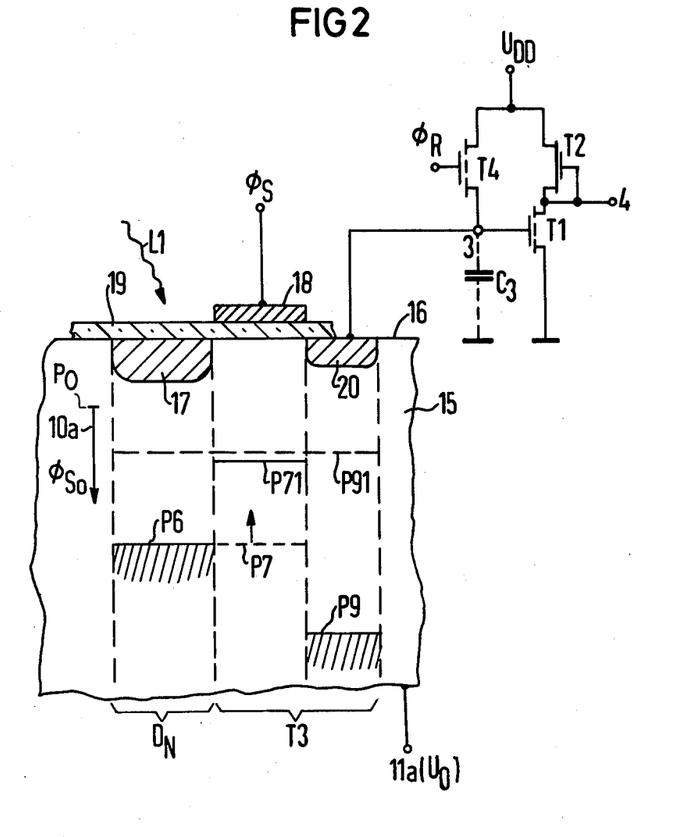
FIG. 2 is a schematic sectional view of one of the optoelectronic sensors and associated components employed in the circuit of FIG. 1.

A portion of the circuit of FIG. 1 containing the photodiode $D_N$ is shown in section in FIG. 2, together with associated connected circuit elements. The photodiode is integrated on a semiconductor substrate 15 of a first conductivity type which may be, for example, p-doped silicon. The photodiode $D_N$ consists of a zone 17 disposed on the boundary surface 16 of the substrate 15 of a second conductivity type which is opposite to the first. The area of the semiconductor substrate 15 adjacent to the zone 17 is covered by a gate 18 which is separated from the boundary surface 16 by a thin insulating layer 19 which may consist, for example, of silicon dioxide. A drain zone 20 of a conductivity type which is also opposite to the first conductivity type forms, together with the gate 18 and the zone 17, the barrier transistor T3. The zone 20 simultaneously serves as the input 3 for the converter consisting of the transistors T1 and T2, and also serves as the source zone for the reset transistor T4. The circuit components T1, T2 and T4 are schematically illustrated in FIG. 2 corresponding to the manner in which they are connected in FIG. 1. The input capacitance of the converter is indicated at $C_3$.

Figure 3:
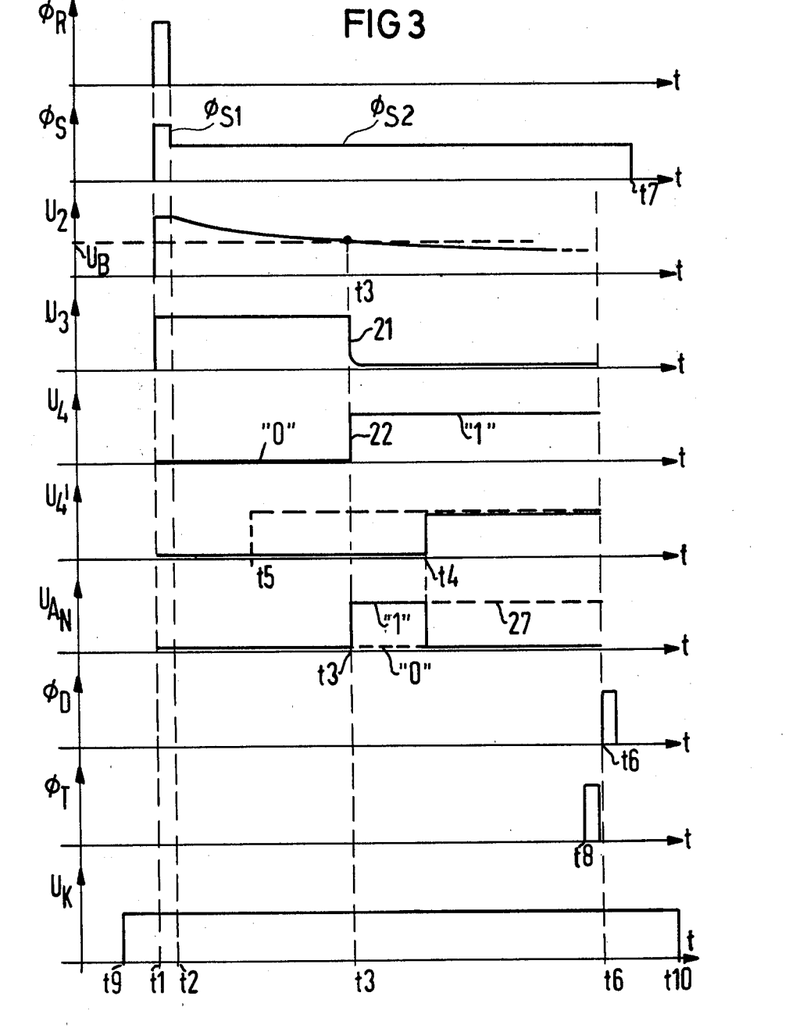
FIG. 3 shows a number of voltage-time diagrams for signals occuring in the circuit of FIG. 1.

Operation of the circuit is as follows. The connection point 2 and the converter input 3 are first reset to high positive potentials. This occurs as a result of clock pulses $\phi_R$ and a pulse $\phi_{S1}$ of the clock pulse voltage $\phi_S$, as are shown in FIG. 3 which commence at a time t1 and which switch the reset transistor T4 and the transistor T3 to respective conductive states. The amplitude of $\phi_{S1}$ is less than that of $\phi_R$ to such an extent that the transistor T3 is operated in the saturation range for which the relation $U_3 - U_2 > \phi_{S1} - U_T - U_2$ holds. The voltages $U_3$ and $U_2$ respectively occur at the converter input 3 and the connection point 2, whereas $U_T$ signifies the starting voltage for the transistor T3. In the saturation range of the transistor T3, the voltage $U_2$ is adjusted by $\phi_{S1}$, for which the relation $U_2 = \phi_{S1} - U_T$ holds.

Under the influence of the voltages $U_2$, $\phi_{S1}$ and $U_3$, which are supplied to the zone 17, the gate 18 and the zone 20, the potential values P6, P7 and P9 of the surface potential $\phi_{So}$ respectively result, which are shown in FIG. 2 in the direction of the arrow 10a. The upper end of the arrow 10a corresponds to the reference potential $P_0$ at which the semiconductor substrate 15 lies during supply of a subtraction voltage $U_0$ via a terminal 11a. In the reset state, a logic signal "0" occurs at the output 4 of the evaluator $B_N$, which approximately corresponds to the reference potential.

At a time t2, the clock pulse voltage $\phi_S$ is lowered to a value $\phi_{S2}$, which lies between $U_2$ at the time t1 and the substrate voltage $U_0$. If $\phi_{S2}$ is below the voltage $U_2 + U_T$, the transistor T3 will be in a blocking state, thus forming a potential barrier P71 beneath the electrode 18. The potentials P6 and P9 remain uninfluenced thereby, so that the progression P6, P71 and P9 of $\phi_{So}$, also shown in FIG. 2, results.

If the photodiode $D_N$ is exposed with light rays L1, the voltage $U_2$ (FIG. 3) and the voltage P6 (FIG. 2) decrease. During the course of a specified integration time, which commences at t2, the potential P6, given a sufficiently strong exposure, can attain the potential barrier P71 at a time t3. In FIG. 3, this time is determined by the time at which $U_2$ attains a threshold value $U_B$. Subsequently, a portion of the charge generated by the photodiode $D_N$ flows via P71 into the zone 20 and lowers the potential P9 to a value of P91, at which time the voltage $U_3$ drops sharply, as is shown in FIG. 3 at 21. The starting voltage of T1 is adjusted so that it is attained by the voltage drop 21 of $U_3$. As a consequence, the transistor T1 is in a blocking state and the voltage $U_4$ rises approximately to the value of the supply voltage, which corresponds to the logic signal "1". Because of a relatively large capacitance $C_{SE}$ of the sensor element between the connection point 2 and the reference potential in comparison with the input capacitance $C_3$ of the converter consisting of the transistors T1 and T2, the potential change from P9 to P91 is relatively great, so that the starting voltage $U_T$ of the transistor T1 is reliably obtained during the voltage drop 21 even in those instances wherein relatively large deviations from ideal component values exist in the circuit.

The electronic switch 7 is activated by the switching state of the evaluator $B_{N-M}$ such that the evaluator output 4 is conductively connected to the circuit output $A_N$ only as long as the evaluator $B_{N-M}$ remains in its reset state, that is, only until charge carriers generated by the associated photodiode exceed the barrier of the barrier transistor contained in that evaluator thus causing the evaluator to flip. Assuming that the evaluator $B_{N-M}$ flips at a time t4, which is shown in FIG. 3 by the voltage waveform for $U_4'$ occurring at the output 4', the voltage jump 22 of $U_4$ results in the occurrence of a logic "1" at the circuit output $A_N$ which is connected in the time interval between t3 and t4. The time dependency of the voltage $U_{AN}$, occurring at the output $A_N$, is also shown in FIG. 3. If the evaluator $B_{N-M}$ has already flipped at a time t5, however, meaning that the photodiode $D_{N-M}$ is more strongly exposed than the photodiode $D_N$, the waveform for the voltage $U_4'$ shown in dashed lines in FIG. 3 occurs and the circuit output $A_N$ always remains at a logic level "0", even after the time t3, as indicated by the dashed line progression of $U_{AN}$ between times t3 and t4 in FIG. 3.

Because the logic "1" signal occurring at the circuit output $A_N$ is initially restricted only to the time interval between t3 and t4, a memory device is preferably associated with the circuit output $A_N$ rendering possible an intermediate storage of the signal for later processing. The stage $S_N$ of the shift register S which statically or dynamically stores the "1" signal (or the "0" signal in the case of a switchover of the evaluator $B_{N-M}$ at the time t5) serves this purpose. Although transistors T15 and T15" are shown respectively disposed between the circuit outputs $A_N$ and $A_{N+M}$ in FIG. 1, in this embodiment these transistors are not necessary and a direct connection between the outputs and the respective stages of the shift register S can be utilized. The transistors T15 and T15" may alternatively be considered as continuously conducting.

As described above, the electronic switch 7 is preferably a field effect switching transistor T8 which interconnects the evaluator output 4 and the circuit output $A_N$ through its source-drain path. The control input 12 of the electronic switch 7 is connected to the gate of the transistor T8.

A logic "1" at the evaluator output 4 results in a logic "0" at the output 11 of the inverter $VT_N$, as a consequence of which the electronic switch 7" is non-conducting so that a logic "1" signal can occur at the circuit output $A_{N+M}$ only when the evaluator $B_{N+M}$ has flipped from its reset position prior to the time t3.

Thus a size comparison of the optically generated charge quantities which have been collected after the time t2 respectively in two photodiodes, for example photodiodes $D_{N-M}$ and $D_N$, takes place. The two photodiodes may be considered a diode pair with a common circuit output, for example, the output $A_N$. The comparison is undertaken by evaluation of the chronological sequence of the flipping operations of the respective evaluators, such as for example, the evaluators $B_{N-M}$ and $B_N$. For the diode pair formed by the photodiodes $D_N$ and $D_{N+M}$, the chronological succession of the flipping operations in the evaluators $B_N$ and $B_{N+M}$ determines the logic signal resulting at the circuit output $A_{N+M}$. In a corresponding manner, identical logic comparison signals result at the additional circuit outputs which are not shown in FIG. 1, which are each respectively associated with two photodiodes.

A pulse $\phi_D$, which commences at a time t6, terminates the time interval during which the circuit shown in FIG. 1 can undertake the above-described size comparisons between the optically generated charge quantities of two respective photodiodes. The pulse $\phi_D$, by connecting the reference potential at the terminals 8, 8' and 8", effects a flipping of any evaluators which up to this time have not yet been flipped as a result of a sufficient accumulation of charge so that all electronic switches such as 7 and 7" are non-conducting. The logic signals stored in the shift register stages respectively connected to the circuit outputs such as $A_N$ and $A_{N+M}$ prior to the time t6 represent the binary coded signals derived from the photodiodes. At a time t7 the pulse $\phi_S$ is terminated, as a consequence of which the potential barriers beneath the gate electrodes of the transistors such as transistor T3 are eliminated.

As described above, the binary coded signals occurring at the circuit outputs such as $A_N$ and $A_{N+M}$ are stored in shift register stages such as $S_N$ and $S_{N+M}$. During dynamic operation of the shift register S, however, the possibility exists that the stored information will be destroyed by term-generation of charges. In a further embodiment of the invention, therefore, a bistable flip-flop such as 23 and 23" is connected in series with each of the circuit outputs as an intermediate memory. Using the bistable flip-flop 23 as an example, the output terminal 24 of the electronic switch 7 is not directly connected with the circuit output $A_N$ as in the earlier embodiment, but is instead connected to the gate of a field effect transistor T9 which has a source terminal connected to the reference potential and a drain terminal 25 connected to the circuit output $A_N$. The portion of the connection line referenced at 24' in FIG. 1, occurring between the electronic switch output 24 and the circuit output $A_N$ is not present in this embodiment. The bistable flip-flop 23 further includes two switching transistors T10 and T11 cross-connected to load elements T12 and T13. The load elements T12 and T13 are connected at a common terminal 26 to the supply voltage $U_{DD}$ and the switching transistors T10 and T11 are connected at a second common terminal to the reference potential. In the embodiment shown in FIG. 1 the load elements T12 and T13 are realized in the form of field effect transistors whose respective gate and source terminals are interconnected. The drain terminal 25 of the transistor T9 is conected between the transistor T10 and the load element T12, and the corresponding connection point between the switching transistor T11 and the load element T13 is connected to the reference potential via the source-drain path of a field effect transistor T14. The gate of the transistor T14 is connected to the output 11 of the inverter $VT_N$. The connection point between the series connection of T10 and T12 is connected to the gate of T11 and the connection point between the series connection of T11 and T13 is connected to the gate of T10.

The above-described bistable flip-flop 23 stores a logic "1" which occurs in the period between times t3 and t4 at the output 4 of the evaluator $B_N$, as indicated by the dashed line 27 in the voltage-time diagram for the voltage $U_{AN}$ in FIG. 3. The binary coded signal, intermediately stored in the bistable flip-flop 23, is supplied to the shift register stage $S_N$ through a transfer transistor T15 at a time occurring shortly before the time t6 by means of a sampling pulse $\phi_T$ commencing at a time t8 which is supplied to the gate of the transistor T15.

The bistable flip-flop 23", associated with the circuit output $A_{N+M}$, is constructed identically to the bistable flip-flop 23 and is connected to the output 24" of the electronic switch 7" and the output 11" of the inverter $VT_{N+M}$ as shown by the dashed lines. The portion of the connection line between 24" and $A_{N+M}$, referenced in FIG. 1 at 24a", is omitted in this embodiment. The binary coded signal, intermediately stored in the bistable flip-flop 23", is supplied to the stage $S_{N+M}$ of the shift register S via a transfer transistor T15", which is also controlled by the sampling pulse $\phi_T$. Each of the other circuit outputs associated with the other diode pairs, not separately shown in FIG. 1, also are provided with corresponding bistable flip-flop circuits and transfer transistors.

In order to obtain a dissipation of the excess charges occurring in the case of a local over-exposure of individual ones of the photodiodes, it is preferably to connect the terminals 8, 8' and 8" to a high positive potential during the time period between times t2 to t6 so that the connection lines between those terminals to the respective drain zones of the transistors T5, T5' and T5" can simultaneously serve as over-exposure channels or reservoirs.

Figure 4:
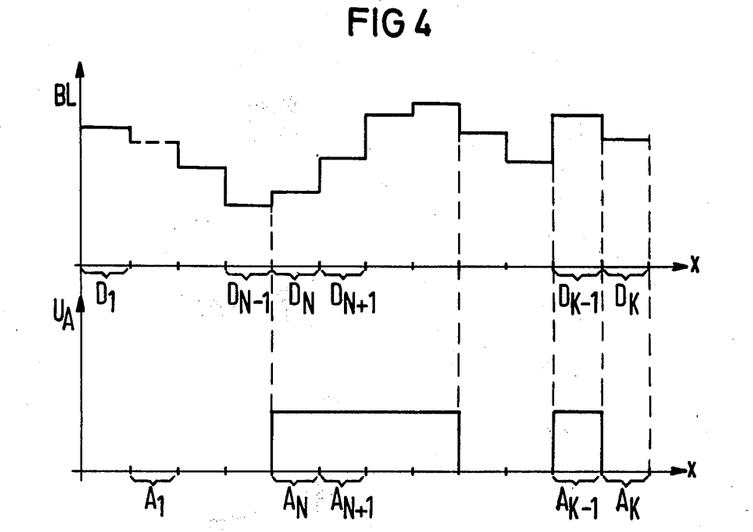
FIG. 4 is a graphic representation of further signals for explanation of the operation of the circuit shown in FIG. 1.

Various illumination levels BL of the individual photodiodes are shown in the upper diagram in FIG. 4 for the individual photodiodes in a diode row expressed in lumens in dependence upon the distance x of the individual diodes from a diode $D_1$ disposed at one end of this row. The diode row comprises diodes $D_1$ through $D_K$. The position of the three diodes $D_N$, $D_{N-M}$ and $D_{N+M}$, illustrated in FIG. 1, are shown in FIG. 4 under the assumption that M=1 by the sections $D_{N-1}$, $D_N$ and $D_{N+1}$ on the horizontal axis. If the diode $D_N$ is more strongly exposed during the integration time between times t2 through t6 than is photodiode $D_{N-1}$, the logic signal "1" is then connected to the circuit output $A_N$. A logic "1" can also be tapped at the circuit output $A_{N+1}$ if the photodiode $D_{N+1}$ is more strongly exposed than the photodiode $D_N$. In the hypothetical conditions illustrated in FIG. 4, however, the diode $D_K$ is more weakly exposed than is the photodiode $D_{K-1}$, so that a logic "0" associated with this diode pair appears at the circuit output $A_K$. The binary coded signals $U_A$, corresponding to the illumination distribution BL shown in FIG. 4, which occur at the circuit outputs $A_1$ through $A_K$ are shown in the lower diagram of FIG. 4, also in dependence upon the distance x of the respective diodes $D_1$ through $D_K$ from the diode $D_1$.

Figure 5:
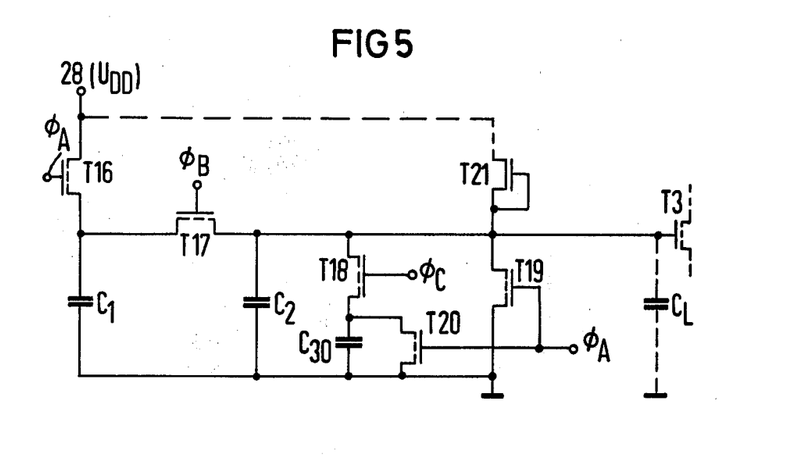
FIG. 5 is a further embodiment of a portion of the circuit shown in FIG. 1.

A circuit for generating the pulse voltage $\phi_S$ is shown in FIG. 5. The circuit includes a capacitor $C_1$ having a first electrode connected through a switching transistor T16 to a terminal 28 which is connected to the supply voltage $U_{DD}$. The first electrode of $C_1$ is also connected through a switching transistor T17 to the gate of the barrier transistor T3 described in connection with FIG. 1 and with the first electrode of a capacitor $C_2$ and to a further switching transistor T18 which is connected in series with a capacitor $C_{30}$. The gate of the barrier transistor T3 is connected through a switching transistor T19 to the reference potential of the circuit to which the second electrode of the capacitor $C_1$, the second electrode of the capacitor $C_2$ and the other terminal of the capacitor $C_{30}$ are also connected. The circuit capacitance between the gate of the barrier transistor T3 and the reference potential of the circuit is schematically shown in FIG. 5 at $C_L$ and is illustrated with dashed lines. The gate terminals of the switching transistors T16 and T19 together with the gate terminal of an additional switching transistor T20 are connected to a clock pulse voltage $\phi_A$. The source-drain path of the switching transistor T20 is connected in parallel with the capacitor $C_{30}$. The gate terminals of the switching transistors T17 and T18 are respectively supplied with clock voltages $\phi_B$ and $\phi_C$.

Figure 6:
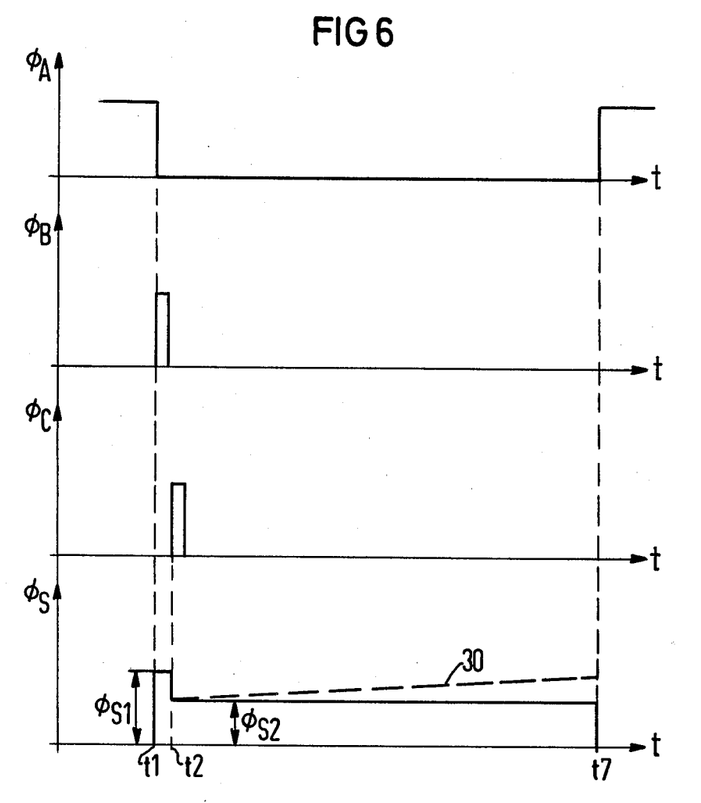
FIG. 6 shows a number of voltage-time diagrams for signals occurring in the operation of the circuit shown in FIG. 5.

Operation of the circuit shown in FIG. 5 will be explained with the aid of the voltage-time diagrams shown in FIG. 6. Prior to the time t1 the switching transistors T16, T19 and T20 are in a conducting state because of the voltage $\phi_A$ connected thereto so that the gate of the barrier transistor T3 is at reference potential. Under these conditions, the capacitor $C_1$ becomes charged to the supply voltage $U_{DD}$. Upon the disconnection of $\phi_A$ at the time t1 and the simultaneous commencement of the clock pulse $\phi_B$, a charge division between $C_1$ and the added capacitances of capacitor $C_2$ and $C_L$ occurs, whereby a voltage $\phi_{S1}$ results at the gate of the barrier transistor T3. At the time t2, as a result of the transistor T18 being switched to a conducting state by the clock pulse voltage $\phi_C$, the capacitor $C_{30}$ is briefly connected in parallel with the existing parallel connection of capacitors $C_1$, $C_2$ and $C_L$, resulting in the voltage $\phi_{S1}$ dropping to the value $\phi_{S2}$. At the time t7, another pulse in the clock pulse voltage $\phi_A$ occurs which switches the transistor T19 to a conducting state and determines the trailing edge of the waveform $\phi_S$.

In a further embodiment of the circuit shown in FIG. 5, the gate of the barrier transistor T3 is connected through a load element T21 to the terminal 28. The load element T21 may be, for example, a field effect transistor of the depletion type, having a gate terminal connected with its source terminal. The load element T21 causes a gradual charging of the parallel-connected capacitors $C_2$ and $C_L$ between the times t2 and t7 to the value of the supply voltage $U_{DD}$, so that a rise 30 of the voltage $\phi_S$ occurs, as is shown in FIG. 6 by the dashed line. This results that a gradual reduction of the potential barrier beneath the gate of the barrier transistor T3 occurs in the integration time between t2 and t6 so that even in the case of a weak exposure of the photodiodes, a sitable pattern of binary coded signals $U_A$ of the type shown in FIG. 4 can still be derived.

In a further embodiment of the invention, metal-insulating layer-semiconductor (MIS) capacitors are employed as the optoelectronic sensor elements instead of the previously-described photodiodes. An MIS capacitor of this type is referenced with K in FIG. 7. The MIS capacitor K has a gate electrode 31 which is separated by the thin insulating layer 19 from the boundary surface 16 of the semiconductor substrate 15. The gate 31 has a terminal 32 to which a voltage $U_K$, as shown in FIG. 3, is supplied. The voltage $U_K$ results in the generation of a space charge zone 33 beneath the gate electrode 31. The remaining circuit elements of FIG. 7 correspond to the same reference symbols. The voltage $U_K$ is selected such that a surface potential $\phi_{So}$ develops beneath the gate electrode 31, which surface potential $\phi_{So}$ is greater than or equal to the potential value P6 shown in FIG. 2. As is shown in FIG. 3, the voltage $U_K$ is connected to the terminal 32 at a time t9, so that prior to the reset time t1, optically generated charge carriers have already collected beneath the gate electrode 31. The voltage $U_K$ is disconnected at a time t10. The use of the MIS capacitor K as a sensor element provides the advantage of a large capacitance $S_{SE}$.

Figure 7:
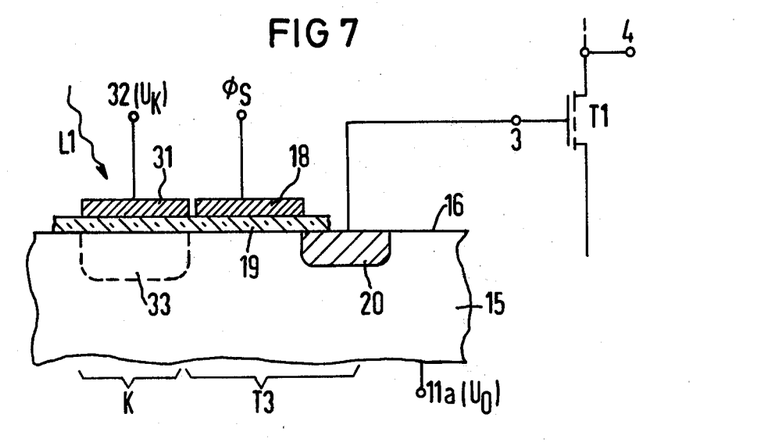
FIG. 7 is a further embodiment of the partial circuit shown in FIG. 2.
Figure 8:
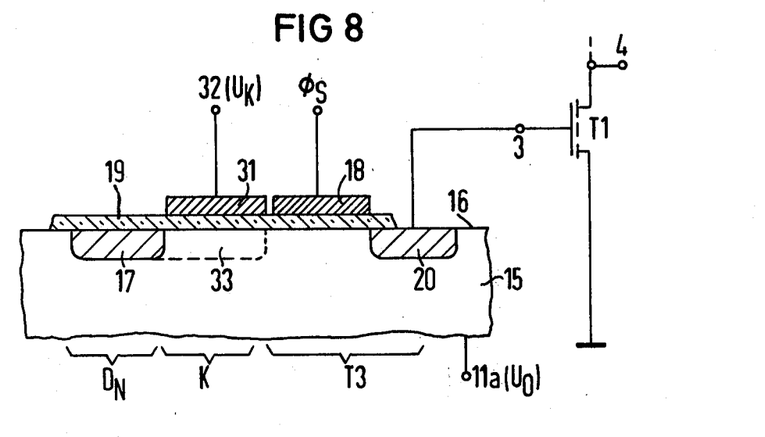
FIG. 8 is another embodiment of the partial circuit shown in FIG. 2.

A further embodiment of the invention is shown in FIG. 8 wherein one photodiode, such as the photodiode $D_N$ in FIG. 2, and one MIS capacitor, such as the MIS capacitor K shown in FIG. 7, are adjacently disposed on the thin insulating layer 19 and together form an optoelectronic sensor element. The circuit elements, already explained in connection with FIGS. 2 and 7, are provided in FIG. 8 with the same reference symbols. The capacitance $C_{SE}$ of the optoelectronic sensor element shown in FIG. 8 is even greater than the optoelectronic sensor element shown in FIG. 7 consisting only of the MIS capacitor K. The activation of the gate electrode 31 via the terminal 32 by the voltage $U_K$ proceeds in the manner already described above in connection with FIG. 7.

The circuit constructed in accordance with the principles of the present invention can be at least partially monolithically integrated on a doped semiconductor substrate. If the circuit is constructed utilizing n-channel MOS technology, the potentials and voltages related to the substrate voltage $U_0$ will exhibit a positive sign. If p-channel MOS technology is employed, the voltages and potentials will exhibit negative signs, and the conductivity types of the doped semiconductor zones will be of the opposite conductivity types to those described above, and the photodiodes will be connected in FIG. 1 with opposite polarity. The optoelectronic sensor elements need not necessarily be disposed linearly and can be arranged in a random spatial configuration without impairment of the derivation of the binary coded output signals in accordance with the principles of the present invention, as long as the distances between the diodes remain small.

The method and circuit disclosed and claimed herein can be employed with particular advantage in optoelectronic range finders of photographic or electronic cameras. In these devices, two separate images are formed of a subject to be photographed by means of two optical devices. Each optical device will have a circuit of the type described herein associated therewith such that the linearly-disposed sensor elements for each circuit are aligned to two lines of the images and thus sample the brightness progressions along these lines. For a known distance of the subject, which may be selected as infinity, the brightness progressions along the two lines are the same, and a maximum correlation between the binary coded output signals for both circuits will exist. If the actual distance of the subject differs from the known distance, the brightness progression of at least one of the two lines will be shifted relative to the position which it assumes as a result of the known distance of the subject. The correlation between the output signals will thus decrease. The binary coded output signals can then be shifted by means of a serial readout from the shift register of one circuit associated with one line in relation to the corresponding output signals of the other circuit associated with the other line, until an optimum correlation is attained. The size of the shift or displacement necessary to obtain the optimum correlation is a measure of the deviation of the actual distance of the subject from the known distance, and hence the actual distance can be determined. The processing of digitized sensor signals for the purposes of undertaking a ranging or focusing of this type are explained in the above-identified German patent application No. P 29 36 492.9.

Although modifications and changes may be suggested by those skilled in the art it is the intention of the inventors to embody within the patent warranted hereon all changes and modifications as reasonably and properly come within the scope of their contribution to the art.

We claim as our invention:

1. A circuit for binary coding of sensor signals received from a plurality of optoelectronic sensor elements comprising:
a plurality of evaluators respectively associated with said optoelectronic sensor elements for generating a binary output signal representing the quantity of optically generated charges generated in the optoelectronic sensor element associated therewith during a specified time period, each evaluator including
   a switching transistor and a load element connected in series therewith for operating as a converter and having a converter input,
   a barrier transistor interconnected between an output of one of said optoelectronic sensor elements and said converter input, and
   a reset transistor for periodically connecting said converter input to a constant voltage source for resetting said evaluator; and an electronic switch having an input connected to the output of one of said evaluators and a control input connected to another of said evaluators such that said evaluators connected to said electronic switch are associated with closely-disposed optoelectronic sensor elements, and having a switch output which serves as a circuit output, whereby said electronic switch conducts the output of said one of said evaluators to said circuit output until said switch is switched to a non-conducting state by a signal from said evaluator connected to said control input for undertaking a quantity comparison of the optically generated charges of the two sensor elements respectively associated with said evaluators connected to said electronic switch.

2. The circuit of claim 1 wherein said optoelectronic sensor elements are arranged adjacently in a row.

3. The circuit of claim 1 wherein said electronic switch is a field effect switching transistor having a source-drain path interconnected between the output of said one evaluator and said circuit output and wherein said control input is connected to the gate of said field effect switching transistor, and further comprising an inverter interconnected between the output of said evaluator connected to the control input of said electronic switch and said gate.

4. The circuit of claim 1 further comprising a shift register having a plurality of stages, said stages respectively connected to said circuit outputs of said circuit.

5. The circuit of claim 4 wherein said shift register is a static shift register.

6. The circuit of claim 4 wherein said shift register is a dynamic shift register.

7. The circuit of claim 1 further comprising a plurality of bistable flip-flops respectively connected to said circuit outputs for intermediately storing the signals at said circuit outputs.

8. The circuit of claim 1 further comprising a means for connecting said sensor elements to a reference potential at the end of said time period.

9. The circuit of claim 8 wherein said means for connecting said sensor elements to a reference potential is a plurality of electronic switches respectively interconnected between said sensor elements and said reference potential and each having a control electrode for selectively electrically connecting said sensor elements and said reference potential.

10. The circuit of claim 1 wherein said optoelectronic sensor elements and said barrier transistor and said inverter in each of said evaluators are monolithically integrated on a doped semiconductor substrate.

11. The circuit of claim 1 wherein said optoelectronic sensor elements are photodiodes.

12. The circuit of claim 1 wherein said optoelectronic sensor elements are metal-insulating layer-semiconductor capacitors.

13. The circuit of claim 1 wherein said optoelectronic sensor elements are each a cooperatively operating adjacently disposed photodiode and metal-insulating layer-semiconductor capacitor.

14. The circuit of claim 1 further comprising a means for controlling the operation of said barrier transistor for defining a beginning of said time period during which said optically generated charge is supplied to said evaluator.

15. The circuit of claim 14 wherein said means for controlling said barrier transistor comprises:

a first capacitor having a first terminal and a second terminal connected to a reference potential;

a switching transistor interconnected between said first terminal of said first capacitor and a supply voltage and having a control electrode;

a second switching transistor interconnected between said first electrode of said first capacitor and a control electrode of said barrier transistor and having a control electrode;

a second capacitor connected in parallel with said first capacitor between said control electrode of said barrier transistor and said reference potential;

a third switching transistor and a third capacitor connected in series, said third switching transistor being connected to said control electrode of said barrier transistor and having a control electrode and said third capacitor being connected to said reference potential; and a fourth switching transistor interconnected between said control electrode of said barrier transistor and said reference potential and having a control input, whereby signals are respectively supplied to said control electrodes of said first and fourth switching transistors for charging said first capacitor to said supply voltage and said first and fourth switching transistors are switched to a non-conducting state simultaneously with said second switching transistor being supplied with a signal at its control electrode for switching said second switching transistor to a conducting state such that said control electrode of said barrier transistor is at a first potential and whereby said third switching transistor is subsequently switched to a conducting state at a beginning of said time period for lowering said potential at said control electrode of said barrier transistor to a second potential.

16. The circuit of claim 15 further comprising a load element interconnected between said control electrode of said barrier transistor and said supply voltage in parallel with said first and second switching transistors.

17. A method for binary coding of signals received from a plurality of optoelectronic sensor elements each having an evaluator associated therewith containing a barrier transistor, a reset transistor and a converter and having an output connected to an input of an electronic switch, said electronic switch having a control electrode connected to the output of a different evaluator, comprising the steps of:

setting said optoelectronic sensor elements and said converter inputs to a high potential by supplying a clock pulse voltage to respective control electrodes of said reset transistors and said barrier transistors;

lowering said clock pulse voltage supplied to said control electrode of said barrier transistor for generating a potential barrier in said barrier transistors, thereby permitting optically generated charges from said sensor elements being in excess of a predetermined charge amount to be supplied to said converter input for changing the output state of said converters;

controlling the conductive state of said electronic switch by the output of said evaluator connected to the control input thereof such that the output of said evaluator connected to the input of said electronic switch is supplied to a circuit output until said evaluator connected to said control input of said electronic switch changes state; and briefly connecting the outputs of said optoelectronic sensor elements to a reference potential for resetting said sensor elements.

18. The method of claim 17 comprising the additional step of raising said clock pulse voltage supplied to said control input of said barrier transistor at a constant rate immediately after the step of lowering said clock pulse voltage.

* * * * *